(12) United States Patent  
Keller et al.

(10) Patent No.: US 6,178,278 B1  
(45) Date of Patent: Jan. 23, 2001

(54) INDOOR/OUTDOOR DRY OPTICAL FIBER CABLE

(75) Inventors: David A. Keller; John C. Rosko; Leslie P. Keller, all of Apex, NC (US)

(73) Assignee: Alcatel, Paris (FR)

( * ) Notice: Under 35 U.S.C. 154(b), the term of this patent shall be extended for 0 days.

(21) Appl. No.: 09/190,706

(22) Filed: Nov. 12, 1998

Related U.S. Application Data

(60) Provisional application No. 60/066,676, filed on Nov. 13, 1997, and provisional application No. 60/079,431, filed on Mar. 26, 1998.

(51) Int. Cl.$^7$ .................................................. G02P 6/44
(52) U.S. Cl. ............................................................. 385/109
(58) Field of Search .................................. 385/109, 110, 385/111, 112, 113

(56) References Cited

U.S. PATENT DOCUMENTS

| | | |
|---|---|---|
| Re. 34,516 | 1/1994 | Houghton . |
| 2,373,115 | 4/1945 | Graves . |
| 3,100,981 | 8/1963 | Engle et al. . |
| 3,675,476 | 7/1972 | Zapfe . |
| 3,744,295 | 7/1973 | Allinikov . |
| 3,881,349 | 5/1975 | Stone . |
| 3,974,678 | 8/1976 | Rooney et al. . |
| 4,038,489 | 7/1977 | Stenson et al. . |
| 4,110,001 | 8/1978 | Olszewski et al. . |
| 4,155,963 | 5/1979 | de Vecchis et al. . |
| 4,176,240 | 11/1979 | Sabia . |
| 4,347,735 | 9/1982 | Desai et al. . |

(List continued on next page.)

FOREIGN PATENT DOCUMENTS

| | | |
|---|---|---|
| 2158963 | 11/1985 | (GB) . |
| 58-10703 | 1/1983 | (JP) . |
| 60-61708 | 9/1985 | (JP) . |
| 63-197907 | 8/1988 | (JP) . |
| 1446583 | 12/1988 | (SU) . |

OTHER PUBLICATIONS

"Patent Abstract of SU," Patent No. SU-1446-583, Dec. 1988, "Multicore optical cable—has additional helical holes accommodating optical fibres and linked via seams to helical grooves", MOSC Communic Eng, V07 (Dec. 23, 1988).

"Patent Abstract of Japan," Patent No. 63-197907, (Aug. 16, 1988), Kaino et al., "Optical Transmission Fiber Containing Linear Object For Optical Transmission Fiber Cable And Its Manufacture".

Patent Abstract of Japan, by Y. Tajima et al., "Submarine Optical Cable", Patent Application No. 56-10928 (Jul. 14, 1981).

(List continued on next page.)

Primary Examiner—Hung N. Ngo
(74) Attorney, Agent, or Firm—Ware, Fressola, Van Der Sluys & Adolphson LLP

(57) ABSTRACT

The present invention provides an indoor/outdoor cable having an optical fiber, a dry-loose tube, a fiberglass yarn matrix and a jacket, with water swellable powder. The dry-loose tube has the optical fiber arranged therein. The fiberglass yarn matrix has fiberglass yarns and is arranged about the dry-loose tube. The jacket is arranged about the fiberglass yarn matrix. Either the jacket, dry-loose tube, fiberglass yarn matrix or a combination thereof, is made from an optimum blend of FRPVC and PVDF in a ratio of 50% PVDF and 50% FRPVC. The ratio is in a range of 30–60% PVDF to 70–40% FRPVC. The diameter of the water swellable powder particles sprinkled on the optical fiber are less than 50 microns, are in a range of 10–50 microns, and are applied on the optical fiber with about 0.10–1.0 grams per meter. The indoor/outdoor flame-retardant cable also may have a cyclically-placed low viscosity elastomer for connecting the one or more optical fibers to the dry-loose buffer tube.

28 Claims, 11 Drawing Sheets

U.S. PATENT DOCUMENTS

| | | |
|---|---|---|
| 4,354,732 | 10/1982 | Arnaud et al. . |
| 4,388,800 | 6/1983 | Trezeguet et al. . |
| 4,389,088 | 6/1983 | Trezequet . |
| 4,401,366 | 8/1983 | Hope . |
| 4,403,499 | 9/1983 | Sack et al. . |
| 4,404,840 | 9/1983 | Burr et al. . |
| 4,422,889 | 12/1983 | Trezequet et al. . |
| 4,456,331 | 6/1984 | Whitehead et al. . |
| 4,464,013 | 8/1984 | Sabia . |
| 4,474,426 | 10/1984 | Yataki . |
| 4,514,058 | 4/1985 | Walton . |
| 4,596,443 | 6/1986 | Diemeer et al. . |
| 4,645,628 | 2/1987 | Gill . |
| 4,661,406 | 4/1987 | Gruhn et al. . |
| 4,690,498 | 9/1987 | Priaroggia . |
| 4,703,998 | 11/1987 | Uchioke et al. . |
| 4,707,074 | 11/1987 | Heywood . |
| 4,711,523 | 12/1987 | Iri et al. . |
| 4,725,121 | 2/1988 | Priaroggia . |
| 4,725,122 | 2/1988 | Anelli et al. . |
| 4,740,054 | 4/1988 | Becker et al. . |
| 4,743,085 | 5/1988 | Jenkins et al. . |
| 4,752,113 | 6/1988 | Saito et al. . |
| 4,767,184 | 8/1988 | Ogasawara et al. . |
| 4,770,489 | 9/1988 | Saito et al. . |
| 4,772,089 | 9/1988 | Ide et al. . |
| 4,781,434 | 11/1988 | Kitagawa et al. . |
| 4,784,461 | 11/1988 | Abe et al. . |
| 4,784,462 | 11/1988 | Priaroggia . |
| 4,786,138 | 11/1988 | Buckley . |
| 4,793,686 | 12/1988 | Saito . |
| 4,802,732 | 2/1989 | Fukuma et al. . |
| 4,804,245 | 2/1989 | Katayose et al. . |
| 4,807,962 | 2/1989 | Arroyo et al. . |
| 4,818,060 | 4/1989 | Arroyo . |
| 4,820,014 | 4/1989 | Nishimura et al. . |
| 4,826,279 | 5/1989 | Nishimura et al. . |
| 4,830,459 | 5/1989 | Chicken et al. . |
| 4,840,453 | 6/1989 | Kitayama . |
| 4,842,366 | 6/1989 | Sawada et al. . |
| 4,859,025 | 8/1989 | Houghton . |
| 4,902,097 | 2/1990 | Worthington et al. . |
| 4,944,570 | 7/1990 | Oglesby et al. . |
| 4,953,942 | 9/1990 | Sasaki . |
| 4,960,068 | 10/1990 | Schotter . |
| 4,960,318 | 10/1990 | Nilsson et al. . |
| 4,964,691 | 10/1990 | Nelson et al. . |
| 4,975,232 | 12/1990 | Hattori et al. . |
| 4,983,013 | 1/1991 | Dotzer et al. . |
| 4,997,257 | 3/1991 | Spedding . |
| 5,013,126 | 5/1991 | Hattori et al. . |
| 5,037,763 | 8/1991 | Petisce . |
| 5,039,197 | 8/1991 | Rawlyk . |
| 5,050,957 | 9/1991 | Hamilton et al. . |
| 5,050,960 | 9/1991 | Sutehall . |
| 5,067,791 | 11/1991 | Nishiyama . |
| 5,071,221 | 12/1991 | Fujitani et al. . |
| 5,082,380 | 1/1992 | Sutehall et al. . |
| 5,087,110 | 2/1992 | Inagaki et al. . |
| 5,126,167 | 6/1992 | Matsuno et al. . |
| 5,136,673 | 8/1992 | Yoshizawa et al. . |
| 5,177,809 | 1/1993 | Zeidler . |
| 5,179,611 | 1/1993 | Umeda et al. . |
| 5,187,763 | 2/1993 | Tu . |
| 5,188,883 | 2/1993 | Rawlyk . |
| 5,193,134 | 3/1993 | Pizzorno et al. . |
| 5,199,094 | 3/1993 | Schneider . |
| 5,202,945 | 4/1993 | Foertsch . |
| 5,212,756 | 5/1993 | Eoll . |
| 5,218,659 | 6/1993 | Schneider . |
| 5,222,177 | 6/1993 | Chu et al. . |
| 5,222,178 | 6/1993 | Betker et al. . |
| 5,224,190 | 6/1993 | Chu et al. . |
| 5,233,678 | 8/1993 | Katurashima et al. . |
| 5,249,249 | 9/1993 | Eoll et al. . |
| 5,274,725 | 12/1993 | Bottoms, Jr. et al. . |
| 5,289,556 | 2/1994 | Rawlyk et al. . |
| 5,293,443 | 3/1994 | Eoll et al. . |
| 5,377,290 | 12/1994 | Ohta et al. . |
| 5,380,472 | 1/1995 | Schneider . |
| 5,408,562 | 4/1995 | Yoshizawa et al. . |
| 5,435,944 | 7/1995 | Shackleton . |
| 5,495,546 | 2/1996 | Bottoms, Jr. et al. . |
| 5,517,591 | 5/1996 | Wagman et al. . |
| 5,533,382 | 7/1996 | Clerkin . |
| 5,542,020 | 7/1996 | Horska . |
| 5,561,729 | 10/1996 | Parris . |
| 5,561,730 | 10/1996 | Lochkovic et al. . |
| 5,566,266 | 10/1996 | Navé et al. . |
| 5,684,904 | 11/1997 | Bringuier et al. . |
| 5,698,615 * | 12/1997 | Pole ..................................... 523/173 |
| 5,740,295 * | 4/1998 | Kinard et al. ........................ 385/109 |
| 5,748,823 | 5/1998 | Navé . |
| 6,049,647 * | 4/2000 | Register et al. ..................... 385/101 |

OTHER PUBLICATIONS

J.T. Chapin et al., "Comparison Of Fire Behavior Of Copper And Fiber Optic Cable In Large And Full Scale Fire Test Facilities", International Wire and Cable Symposium, 1997 pp. 775–784.

Siegfired Richter et al., "Testing Of Cables Designed For Fire Resistance A Comparison of U.S. And European Standards", International Wire and Cable Symposium, 1997, pp. 752–760.

Michael R. Ellwanger et al., "High Fiber Count Indoor/Outdoor Fiber Optic Cable", NFOEC Proceedings, 1996, pp. 371–380.

Allan Kaiser et al., "Indoor/Outdoor Fiber Optic Cable", NFOEC Proceedings, 1996, pp. 347–355.

* cited by examiner

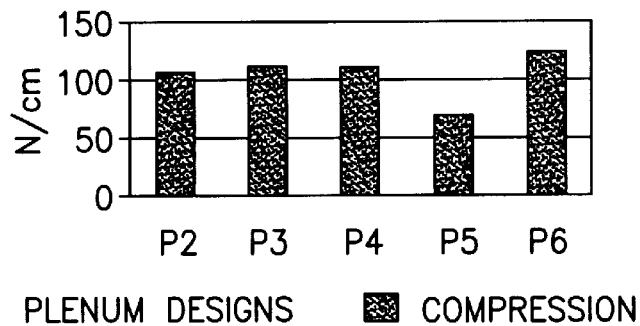
FIG.16
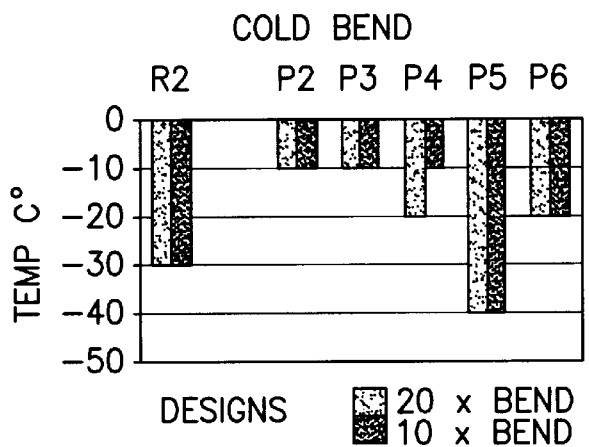
FIG.17
UL 1666 RISER RESULTS:
| PARAMETER | MAX. | RESULTS |
|---|---|---|
| FLAME | 12 FT | 6/5-6 FT-IN |
| MELT | 12 FT | 6-2/6-8 FT-IN |
| CHAR | 12 FT | 5-10/6-3 FT-IN |
| ASH | 12 FT | 5-2/5-10 FT-IN |
| TEMP | 850 F | 429/456 F |
FIG.18

UL 910 PLENUM RESULTS

| PARAMETER | MAX. | RESULTS |
|---|---|---|
| FLAME | 5 FT | 2/2 |
| PEAK SMOKE | 0.5 | 0.33/.42 |
| AVG. SMOKE | 0.15 | 0.12/0.13 |

FIG.19

GR-20 AND GR-409

| TEST | GR-20 | GR-409 | OUTDOOR-RISER RESULTS | OUTDOOR-PLENUM RESULTS |
|---|---|---|---|---|
| LOW TEMP. BEND | 20x −30C | 20x −20C | 20x −30C | 20x −20C |
| IMPACT RESIST. | 25 CYC 2.2 N·m | 25 CYC 2.2 N·m | 25 CYC 5.9 N·m | 25 CYC 2.2 N·m |
| COMP. STRENGTH | 220 N/cm | 100 N/cm | 175 N/cm | 110 N/cm |
| TENSILE STRENGTH | 2660 N | 1320 N | 1335 N | 1335 N |
| TWIST | 10 CYC 2 m | 10 CYC 2 m | 10 CYC 2 m | 10 CYC 2 m |
| CYCLIC FLEXING | 25 CYC | 25 CYC | 25 CYC | 25 − 300 CYC |
| TEMP. CYC −AGE | −40 +70C & 85C AGE | −20 +50C & 85C AGE | −40 +70C & 85C AGE | −40C TO +70C & 85C AGE |
| WATER PEN | 24 HR UNAGED 1 HR AGED | N/A | 24 HR UNAGED 1 HR AGED | 24 HR UNAGED 1 HR AGED |

FIG.20

INDOOR/OUTDOOR DRY OPTICAL FIBER CABLE

RELATED APPLICATIONS

This application claims benefit to a provisional patent application having Serial No. 60/066,676 (WFVA No. 928-022), filed Nov. 13, 1997, as well as a provisional patent application having Serial No. 60/079,431 (WFVA No. 928-024), filed Mar. 26, 1998, both hereby incorporated by reference.

BACKGROUND OF THE INVENTION

1. Technical Field

This invention relates to an optical fiber cable; and more particularly relates to an indoor/outdoor optical fiber cable that meets various competing industry standards such as peak flame, peak smoke, average smoke, compression and cold temperature bend tests.

2. Description of Related Art

Campus cables are known in the art and include four (4) categories, such as outdoor, outdoor-riser, riser and plenum cable designs. Balancing the industry specifications with current demand, results in strategic performance targets for such cables which include flame peak, smoke peak, average smoke, cold bend, compression, and temperature cycling attenuation.

Campus cables with components made of polyvinyl chlorides (PVC) have a difficult time consistently passing the average smoke requirement for the Underwriters Laboratory (UL) 910 test; while cables with components made of polyvinylidene fluorides (PVDF) generate very little smoke but do not process well when pressure extruded around fiberglass yarns.

Existing yarn-matrix units with or without water swellable powder are not flame and smoke retardant. Some yarn-matrix combinations exhibit low smoke and relatively low flame but do burn easily and are not considered flame retardant.

In the prior art, when running cable between buildings, an indoor plenum cable is used in combination with an outdoor cable. One of the major disadvantages of this approach is that the indoor plenum cable must be spliced to the outdoor cable and the cost of splicing is more expensive than the actual cost of the cable.

First Patentability Search

A first patentability search was conducted in the United States Patent and Trademark Office for patents related to an indoor/outdoor cable using plenum (i.e. flame retardant) material. The field of the patentability search included class 385, subclasses 109–114. The following patents were found:

U.S. Pat. No. 4,743,085 discloses a fiber cable that includes a polyethylene or polyvinyl chloride (PVC) core buffer tube 28 enclosing plural fibers 23, and an outer plastic jacket 36. See column 4, lines 13–25. First and second layers of strength members 40 and 50 of glass fiber yarn are included between the core tube and jacket. A waterblocking material 29 is included in the core tube. (See FIGS. 1–3.)

U.S. Pat. No. 5,050,957 discloses a fiber service cable which has a central buffer tube 40 formed of polybutylene terephthalate (PBT) or polypropylene (PP) material, and a jacket 44 formed of PVC. Fibers 22 and a waterblocking material are located within the buffer tube. A rip cord 58 having an encircling waterblocking yarn are included as taught in the paragraph bridging columns 8 and 9. Strength members 54 are also included as shown in FIG. 1. (See also column 4, lines 21–26, and column 5, lines 63–68.) The PVC jacket is flame-retardant as described in column 8, lines 50–58.

U.S. Pat. No. 5,561,729 discloses a fiber cable which has a central buffer tube 11 and a jacket 22 both of which may be formed of PVC, PBT or PVDF. See column 4, lines 47–56. Glass reinforcement fibers may be included in the materials.

U.S. Pat. No. 5,566,266 discloses a fiber service cable that has a single layer core tube of PBT material or a double layer with the inner layer being polycarbonate and the outer layer PBT, as described on column 2, lines 62–67. The outer jacket 22 is made of flame retardant PVC or flame retardant PVDF, as described on column 3, lines 33–37. Strength members 18 having water swellable material may be stranded about the core tube, as described on column 3, lines 14–18.

U.S. Pat. No. 5,748,823 discloses a fiber cable that is suitable for use in building plenums. The cable includes a core tube formed of PVC or PVDF, and a jacket 5 formed of PVC or PVDF. See table 1 in column 3. Layers 6 and 12 of fiberglass yarns are disposed about the core tube 8, as described on column 5, lines 1–8.

Second Patentability Search

A second patentability search was conducted in the United States Patent and Trademark Office for patents related to a combined indoor/outdoor cable using polyvinylidene fluoride (PVDF) in combination with flame retardant polyvinyl chloride (FRPVC). The field of search included class 385, subclasses 109–114. The following patents were found:

U.S. Pat. No. 4,770,489 discloses a fiber cable which has a central buffer tube 34 formed of polyester plastic, and an outer jacket 38 formed of a fiber reinforced plastic, as shown in FIG. 2A and described on column 3, lines 42–52.

U.S. Pat. No. 4,818,060 discloses a fiber building cable which, as shown in FIGS. 1–5, includes a central buffer tube 30 formed of PVC, and an outer jacket 37 formed of PFC or PVDF, as described on column 4, lines 66–68; and column 6, lines 10–14. The cable also has two strength layers 42 and 52 with portions of the layer 52 being coupled to the jacket 37, as described on column 8, lines 34–47.

U.S. Pat. No. 5,050,957 discloses a fiber cable having a buffer tube 40 formed of PBT, and an outer jacket 44 formed of PVC, as described on column 4, lines 29–34; and column 5, lines 63–68. The jacket has strength members 54 embedded therein, as shown in FIG. 1 and described on column 6, lines 33–43.

U.S. Pat. No. 5,561,729 discloses a fiber cable which uses fiber reinforced plastic in the buffer tube and jacket. The buffer tube 11 and jacket 22 can be formed of the several plastics described on column 4, lines 47–56. These plastics include PVC and PVDF or a combination thereof. FIG. 2 shows the use of reinforcing fibers 20 in the plastic that may be used in tubes 11 or 22. U.S. Pat. No. 5,561,729 does not disclose or suggest to use PVDF in combination with flame retardant polyvinyl chloride (FRPVC) for passing the average smoke requirement for the UL 910 test as well as the cold bend, compression, and temperature cycling attenuation industry tests.

U.S. Pat. No. 5,566,266 discloses a fiber cable which has a PBT buffer tube 11, and a jacket 22 formed of PVDF or PVC, as described on column 2, lines 62–67; and column 3, lines 33–36. Strength members 15 are partially embedded in the jacket 22.

U.S. Pat. No. 5,748,823 discloses a fiber cable suitable for use in building plenums. The cable has a core tube which may be formed of PVC or PVDF, and a jacket which may be formed of PVC or PVDF. See the Table in column 3. Layers of strength members 6 and 12 are included around core tube 8 such that when the jacket 5 is pressure extruded, the material flows around at least the outer layer, as described on column 5, lines 9–14.

Third Patentability Search

A third patentability search was conducted in the United States Patent and Trademark Office for patents related to a cable having trace amounts of water swellable powder sprinkled on the optical fiber. The field of search included class 385, subclasses 102, 109–114; and class 523, subclass 173. The following patents were found:

U.S. Pat. No. 4,401,366 discloses a fiber optic cable that includes a central core 12 with grooves 16 supporting optical waveguides 18 within an outer sheath 22, as shown in FIG. 1. A mixture of hydrophilic powder and hydrophobic powder is included around the waveguides as described on column 3, lines 58–68.

U.S. Pat. No. 5,684,904 discloses an optical fiber cable that includes buffer tubes 20 wherein a coating formed from a mixture of moisture-absorptive powder and resin is applied to the inner buffer tube surface, outer buffer tube surface or both inner and outer surfaces. FIG. 2 shows a coating 19 on the inner surface of a buffer tube 8, and FIG. 3 shows all of the suggested coating alternatives, as described on column 3, lines 42–60, and column 4, lines 35–42.

U.S. Pat. No. 5,698,615 discloses optical cables that include a filler material composed of water swelling powder and an additive powder, as shown in FIG. 7 and described on column 10, lines 57–64. The filling compounds have been used in electrical and optical cables, as described in the paragraph bridging columns 13 and 14.

Japanese patent No. 58-10703 discloses an optical fiber cable that includes polyacrylamide powder in the spaces between fibers to function as a water blocking material.

Most of the prior art references, including U.S. Pat. No. 5,698,615, use composite material having water swellable powder which cause microbending in the fiber under certain cold temperature conditions. See U.S. Pat. No. 5,698,615, FIG. 6, filling compound FC2.

Securing Optical Fiber in Cables for a Riser Application

Moreover, when cables are used in a riser application, the optical fiber must be held in the buffer tube so it does not fall out during installation. Many different methods are known in the art for holding the optical fibers inside a buffer tube in a cable.

Cables having buffer tubes without gel are known, but must be coiled intermittently at various elevations to prevent the optical fibers or optical fiber ribbons within from slipping to a lower level. However, even though coiling may be used, there is still the need to prevent water ingress and allow some coupling of the fiber to the tube for riser applications.

Cables are also known having a tight structure or semi-tight structure such as a micro tube for holding optical fiber or optical fiber ribbon in place. However, such cables have the problem of requiring a stripping, scoring or shaving step of the buffer tube to access the fiber therein which causes damage to the fiber.

Cables are also known having gel for holding optical fiber or optical fiber ribbon in place, preventing water ingress in the buffer tube and allowing for fiber helix movement as the cable expands and contracts due to temperature. However, such cables have the problem of removing the gel with a solvent wipe removal or other messy cleanup.

Many U.S. Pat. Nos. 4,464,013; 5,187,763 and 4,176,240 show and describe using a filling material between a sheath and optical fiber, none of which are cyclically placed.

All of the aforementioned patents are hereby incorporated by reference.

SUMMARY OF THE INVENTION

The present invention provides an indoor/outdoor cable having an optical fiber, a buffer tube, a fiberglass yarn matrix and a jacket. The buffer tube has the optical fiber arranged therein. The fiberglass yarn matrix has fiberglass yarns and is arranged about the buffer tube. The jacket is arranged about the fiberglass yarn matrix. Either the jacket, the buffer tube, fiberglass yarn matrix, or a combination thereof, is made from an optimum blend of flame retardant polyvinyl chloride (FRPVC) and polyvinylidene fluoride (PVDF). The optimum blend is in a range of 30–60% PVDF to 70–40% FRPVC, and preferably in a ratio of about 50% PVDF and 50% FRPVC. Embodiments are also envisioned wherein the optimal blend is in a range of 5–15% PVDF to 95–85% FRPVC.

The indoor/outdoor flame-retardant cable may also include trace amounts of water swellable powder particles sprinkled on the optical fiber arranged inside the buffer tube. The diameter of the water swellable powder particles are less than 50 microns, are in a range of 10–50 microns, and are applied on the optical fiber with about 0.10–1.0 grams per meter.

The indoor/outdoor flame-retardant cable may also include a fiberglass yarn matrix having one or more layers of fiberglass yarn, i.e. a single layer, a dual layer, etc. In one embodiment, the fiberglass yarn is made from water-swellable yarn. The water swellable powder is made from a copolymer blend of polyacrylate and polyalcohol resins.

The indoor/outdoor flame-retardant cable may also include a cycled placement of a low viscosity elastomer inside the buffer for loosely affixing the optical fiber to the buffer tube. The low viscosity elastomer flexibly retains the optical fiber in place in a riser application, and prevents the ingress of water and other moisture.

The object of the present invention is to provide a dry indoor/outdoor flame-retardant cable that passes the flame retardancy requirements for indoor UL-rated plenum cables, the cold shrinkage requirements for outdoor cables, and does not use gel inside the buffer tube. The whole thrust of the new dry indoor/outdoor flame-retardant cable is to use a blend of flame retardant polyvinyl chloride (FRPVC) and polyvinylidene fluoride (PVDF). Testing has shown that the optimal blend for the cable jacket is in a range of 30–60% of PVDF and 70–40% FRPVC. In this range, the new dry indoor/outdoor flame-retardant cable meets the highest flame retardancy standard, the highest cold temperature standard, as well as other demanding cable industry standards.

Overall, the present invention provides an intricate cable design that meets the competing demands of an indoor/outdoor cable and satisfies a real need in the art. The cable has important applications in multi-building complexes such as a group of corporate office buildings or a college campus, where a cable must be run from one building to another. Inside a building, flame retardancy is a principle concern. Outside a building, cold shrinkage is a principle concern. The new dry indoor/outdoor flame-retardant cable eliminates the need for approximately half the required splicing, which results in a significant cost savings for installing the cable in multi-building complexes.

The new cable also eliminates the need for gel or other material requiring solvent wipe removal from a buffer tube of a cable, while at the same time preventing water ingress in the buffer tube and allowing for fiber helix movement as the cable expands and contracts from −40 to +70 degrees C.

Some other advantages of the new indoor/outdoor cable design include the following:

1) Flexibility, crush, cold temperature bend and flame retardant characteristics and process-ability are more easily achieved with a blend of PVDF and FRPVC than either material used individually.
2) The dry-loose buffer tube design using water swellable powder on the optical fiber eliminates the need for gels that are flammable, as well as for gels that are flame retardant but expensive.
3) Thermoplastic, flame retardant, smoke inhibiting, water swellable matrix comprised of a PVDF/FRPVC blend with or without water swellable powder which encloses fiberglass yarns can provide a tensile and anti-buckling strand for a key assembly element for flexible optical fiber or composite cables.

A DESCRIPTION OF THE DRAWING

For a fuller understanding of the nature of the invention, reference should be made to the following detailed descriptions taken in connection with the accompanying drawings, not in scale, in which:

FIG. 16 is a chart of compressive load for plenum constructions showing plenum design versus compression in newtons per centimeter.

FIG. 17 is a chart of cold bend for a 20× blend and a 10× blend showing the designs versus temperature in degrees Celsius.

FIG. 18 is a table of UL 1666 riser results showing the parameter, the maximum and the results.

FIG. 19 is a table of UL 910 plenum results showing the parameter, the maximum and the results.

FIG. 20 is a table of GR-20 and GR-409 results showing the test, the GR-20, the GR-409, the outdoor-riser results and the outdoor-plenum results.

BEST MODE FOR CARRYING OUT THE INVENTION

Figure 1:
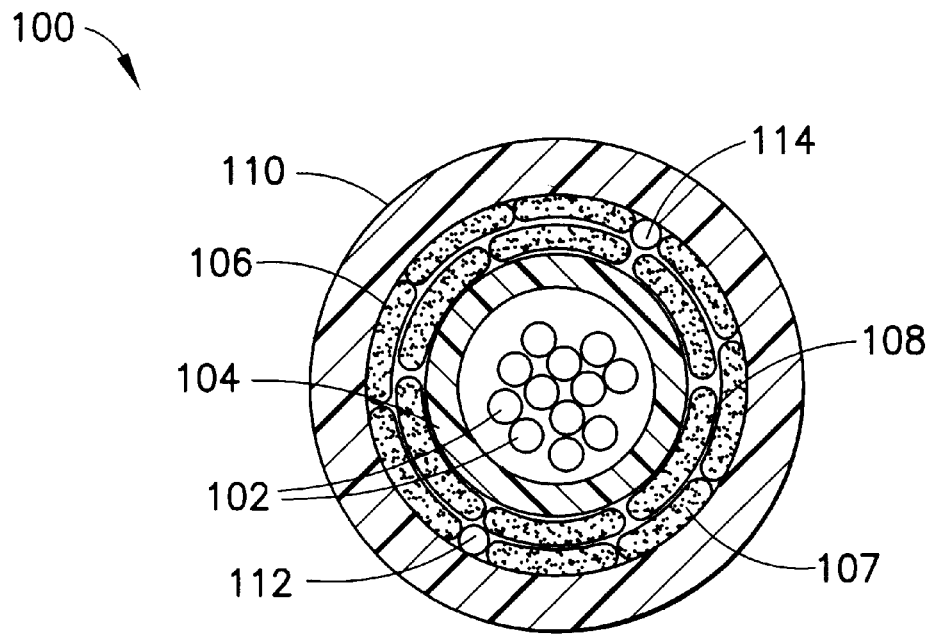
FIG. 1 is a diagram of a cross-section of one embodiment of an optical fiber cable that is the subject matter of the present invention.

The New Indoor/Outdoor Cable Design in FIG. 1

FIG. 1 shows an indoor/outdoor flame-retardant cable generally indicated as 100. The indoor/outdoor flame-retardant cable 100 includes one or more optical fibers 102; a buffer tube 104 having the one or more optical fiber 102 arranged therein; a fiberglass yarn matrix generally indicated as 106 having one or more layers of fiberglass yarns indicated as 107, 108 (see also FIG. 4) being arranged about the buffer tube 102; and a jacket 110 being arranged about the fiberglass yarn matrix 104. As shown, the indoor/outdoor flame-retardant cable 100 also has ripcords 112, 114.

In the present invention, either the buffer tube 102, the fiberglass yarn matrix 104, the jacket 110, or a combination thereof, is made from an optimal blend of polyvinylidene fluoride (PVDF) and flame retardant polyvinyl chloride (FRPVC). The optimal blend is in a range of 30–60% of PVDF and 70–40% FRPVC, and preferably in a ratio of 50% PVDF and 50% FRPVC. Embodiments are also envisioned wherein the optimal blend is in a range of 5–15% PVDF to 95–85% FRPVC. In this range, the new dry indoor/outdoor flame-retardant cable meets the highest flame retardancy standard, the highest cold temperature standard, as well as other demanding cable industry standards, as discussed in more detail below.

The fiberglass yarn matrix includes strands of fiberglass in a yarn matrix. As shown, the fiberglass yarns may include water-swellable material, which are known in the art as water-swellable yarns, although the scope of the invention is not intended to be limited to only such yarns. A person skilled in the art would appreciate how to construct a cable like the one shown in FIG. 1, having a combination of one or more optical fibers arranged in a buffer tube, a fiberglass yarn matrix wrapped around the buffer tube, and a jacket 110 arranged about the fiberglass yarn matrix. The scope of the invention is not intended to be limited to any particular way for doing the same.

Figure 2:
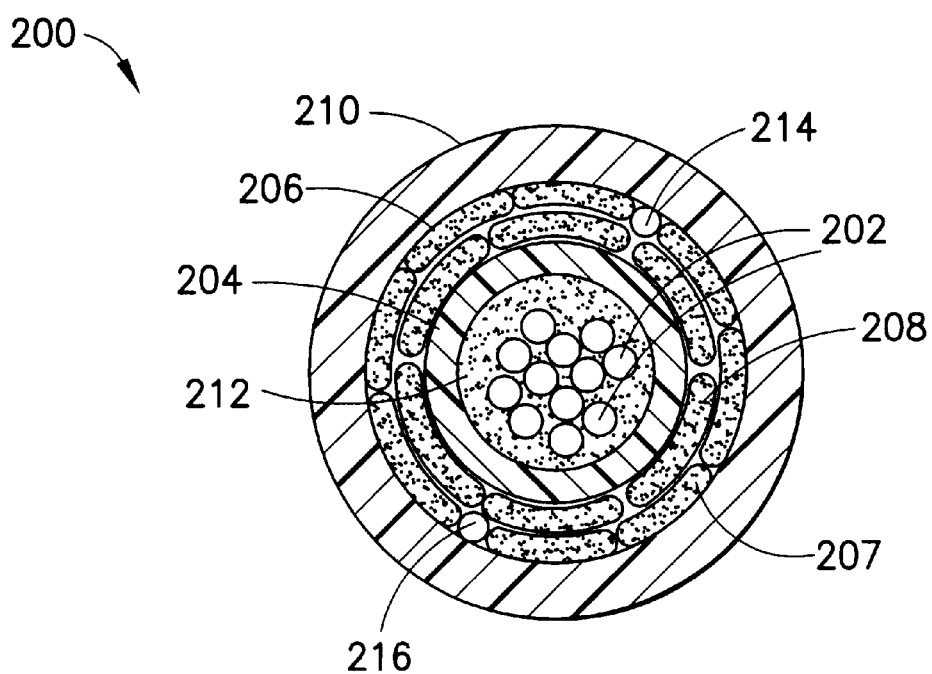
FIG. 2 is a diagram of a cross-section of a second embodiment of an optical fiber cable that is the subject matter of the present invention.

The New Indoor/Outdoor Cable Design in FIG. 2

FIG. 2 shows another embodiment of an indoor/outdoor flame-retardant cable generally indicated as 200. The indoor/outdoor flame-retardant cable 200 has one or more optical fibers 202; a dry-loose buffer tube 204 having the one or more optical fibers 202 arranged therein; a fiberglass yarn matrix 206 having two layers of fiberglass yarns indicated as 206, 208 arranged about the dry-loose buffer tube 204; and a jacket 210 being arranged about the fiberglass yarn matrix 204. As shown, the indoor/outdoor flame-retardant cable 200 also has ripcords 212, 214. Similar to the cable shown in FIG. 1, either the dry-loose tube 204, the fiberglass yarn matrix 206, the jacket 210, or a combination thereof, may be made from an optimal blend of polyvinylidene fluoride (PVDF) and flame retardant polyvinyl chloride (FRPVC). Similar to that discussed above in relation to FIG. 1, the optimal blend may be in a range of 30–60% of PVDF and 70–40% FRPVC, and preferably in a ratio of 50% PVDF and 50% FRPVC.

Moreover, the indoor/outdoor flame-retardant cable 200 may include water swellable powder particles generally indicated as 212 sprinkled on the one or more optical fibers 212 arranged inside the buffer tube 204. The water swellable powder particles 212 are less than 50 microns, are in a range of 10–50 microns, and are applied on the one or more optical fiber 202 with about 0.10–1.0 grams per meter. During manufacture of the cable, the trace amounts of water swellable powder 212 are electrostatically sprinkled on the one or more optical fibers 202 before being arranged inside the dry-loose buffer tube 204. The water swellable powder 212 completely eliminates the need for using messy and sloppy gel. The use of trace amounts of water swellable powder significantly reduces the adverse effects of microbending under certain cold temperature conditions. The water swellable powder 212 also eliminates the need for a gel that might otherwise adversely react with the FRPVC in the buffer tube 204. The use of water swellable powder 212 is the "dry" aspect of the dry-loose tube 204 of the new dry indoor/outdoor flame-retardant cable 200.

There is strong demand in the industry for eliminating the need for using gel inside the buffer tube because it is sloppy and messy to deal with during splicing. The new dry indoor/outdoor flame-retardant cable 200 takes advantage of important advances in new water swellable powders which are now capable of swelling in volume about 200 times to soak up undesirable water and moisture in the buffer tube.

The water swellable powder 212 may be made from a copolymer blend of polyacrylate and polyalcohol resins. A polyacrylamide resin blend alone is not as safe for people or as stable as the newer copolymer blends. The polyacrylate/polyacrylamide copolymer blend is ground and kneaded into 1–300 micron particles. The polyacrylamide by itself allows for better absorption in salt water but is less friendly for the human body to flush out. The polyacrylate/polyalcohol blend is a safe material and is thus the component used in most baby diapers. It is a smaller and less rigid polymer chain than the two above, lends itself to less clumping, and can be rendered to a particle range of 1–106 microns which is then sifted or fluidized into a 10–50 micron particle range for use in the new indoor/outdoor cable design.

The smaller particle size of the polyacrylate/polyalcohol process and the safety issues allow it to be safely offered in a consumer product where the powder may freely float in the air and direct human handling is expected.

The polyacrylate/polyacrylamide products are currently, mostly relegated to agricultural use, and when they are used in the cabling industry, they are glued to a tape or substrate. They are not currently used in the free, unbonded form to any great extent.

Thus, the key element of this feature of the present invention is that a polyacrylamide alone is not safe for unattached use or likely to have a sufficiently small enough particle range to be used for the electrostatic application or for our current attenuation requirements.

A person skilled in the art would appreciate how to construct a cable having a combination of one or more optical fibers arranged in a buffer tube, a fiberglass yarn matrix wrapped around the buffer tube, and a jacket 110 arranged about the fiberglass yarn matrix, and how to electrostatically sprinkled the water swellable powder on the one or more optical fibers 202 before being arranged inside the dry-loose buffer tube 204. The scope of the invention is not intended to be limited to any particular way for doing the same.

Figure 3:
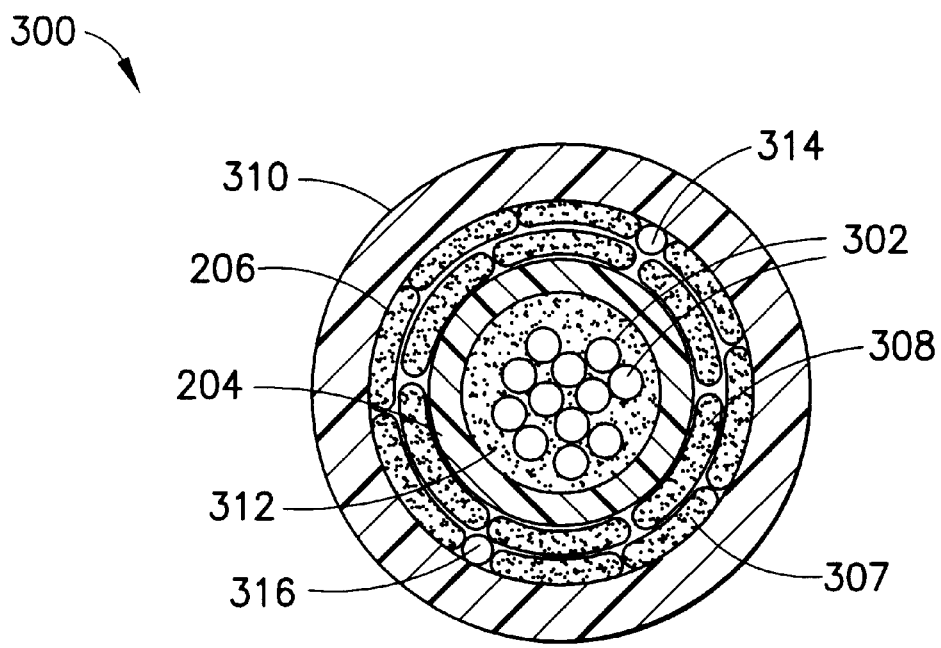
FIG. 3 is a diagram of a cross-section of a third embodiment of an optical fiber cable that is the subject matter of the present invention.

The New Indoor/outdoor Cable Design in FIG. 3

The basic idea of the new indoor/outdoor cable design generally indicated as 300 in FIG. 3 is similar to the cable shown in FIGS. 1 and 2. The indoor/outdoor flame-retardant cable 300 has one or more optical fibers 302; a dry-loose buffer tube 304 having the optical fiber 302 arranged therein; a fiberglass yarn matrix 306 having two layers of fiberglass yarns indicated as 307, 308 arranged about the dry-loose buffer tube 304; and a jacket 310 being arranged about the fiberglass yarn matrix 304. As shown, the indoor/outdoor flame-retardant cable 300 also has ripcords 312, 314. Either the dry-loose tube 304, the fiberglass yarn matrix 306 with water swellable powder, the jacket 310, or a combination thereof, may be made of an optimum blend of PVDF and FRPVC. Similar to that discussed above in relation to FIGS. 1 and 2, the optimal blend may be in a range of 30–60% of PVDF and 70–40% FRPVC, and preferably in a ratio of 50% PVDF and 50% FRPVC. As discussed above, the dry-loose buffer tube 304 can also be sprinkled with water swellable powder to eliminate the use of a gel that might otherwise adversely react with the FRPVC material in the dry-loose buffer tube 304.

Figure 3A:
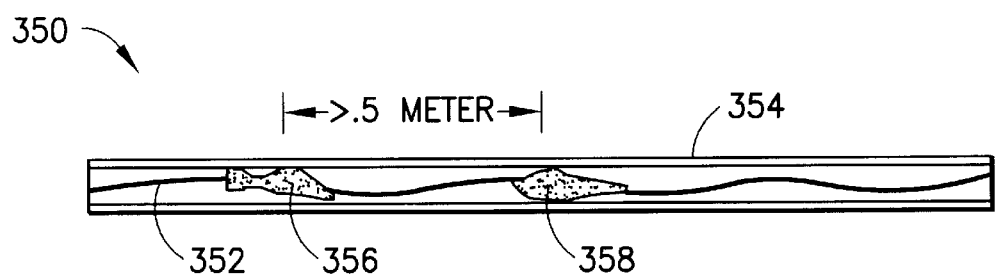
FIG. 3A is a diagram of a cable having cycled, low viscosity elastomer that is the subject matter of the present invention.
Figure 3B:
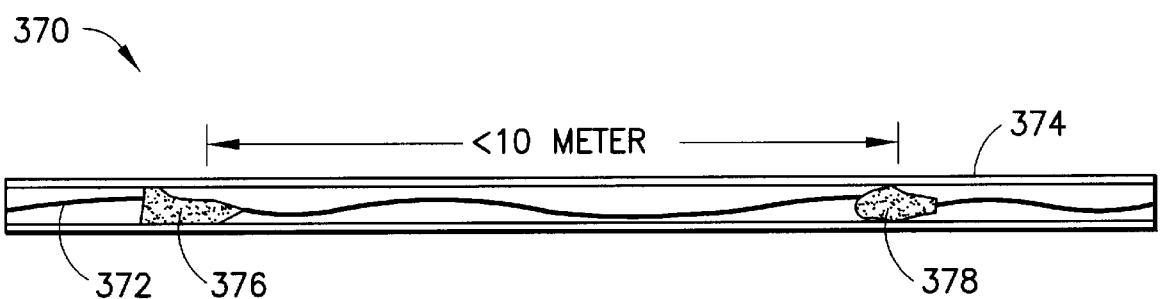
FIG. 3B is a diagram of the cable having cycled, low viscosity elastomer about every 0.5 meters.
Figure 3C:
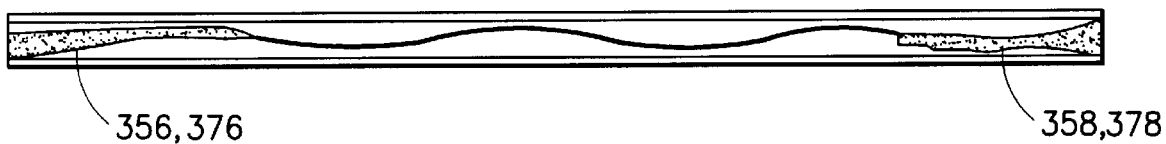
FIG. 3C is a diagram of a cable having cycled, low viscosity elastomer about every 10.0 meters.

In addition, the indoor/outdoor flame-retardant cable 300 has cyclically-placed low viscosity elastomer that are shown and described in relation to FIGS. 3A, 3B, 3C.

Cycled Fiber Lock

FIGS. 3A and 3B show cables generally indicated as 350; 370 having one or more optical fibers 352; 372 arranged in a buffer tube 354, and having cyclically-placed low viscosity elastomer generally indicated as 356, 358; 376, 378 to hold the one or more optical fibers 352; 372 in the buffer tube 354; 374. The cyclically-placed low viscosity elastomer 356, 368; 376, 378 prevents water ingress in the buffer tube 354; 374 especially when used in combination with water swellable powder discussed above in relation to FIG. 2, and allows for fiber helix movement as the cable expands and contracts from −40 to +70 degrees Celsius.

During manufacture of the cable, a cycled injection of a low viscosity material is applied to the optical fiber. After 24 hours, the low viscosity material converts to a low hardness elastomer in buffer tube. The application may include dripping a 2-part mix of low viscosity material on the optical fiber, such as a flame-retardant product of Dow Corning named SYLJRD Silguard 184 silcone elastomer, base and curing agent. In less than ½ hour, the low viscosity material converts to a low hardness elastomer in buffer tube. The resulting "rubber like" compound holds the optical fiber or optical fiber ribbon in place for riser applications, yet is dry to the touch and is easily removed from the optical fibers or optical fiber ribbons at installation. Another product of Smooth On Inc. is name Liquid Rubber—Rubber Molded Compound (PMC-121/40, Parts A and B), which is not flame-retardant, but may be applied every 30 meters.

FIG. 3C shows the cyclically-placed low viscosity elastomer 356, 368; 376, 378 as a thin wavy section of material, which thickens at a mid section, to contact the buffer tube wall generating a fiber friction lock when cured or crosslinked.

The slow curing (24 hour) time allows for gradual tube shrinkage and relaxation and repositioning of the optical fiber or optical fiber ribbon helix within the tube, prior to curing. (See generally FIG. 3C)

For example, the low hardness elastomer can be placed every ½ meter as shown in FIG. 3A, or every 10 meters as shown in FIG. 3B, depending on the application. The low hardness elastomer 356, 358; 376 378 allows freedom for the one or more optical fibers to contract in tube window at cold temperature between injection points, where complete filling of the inner-space would generate a tight structure.

Cycled placement position of the low hardness elastomer can be marked on the exterior of the tube in the event the installer would like to know its location.

The advantages include a 90% reduction in material filling usage and a 25% reduction in cable and preparation time. Slow 24 hour cure allows for even fiber distribution. Cycled fiber lock allows for fiber helix in cable construction.

The cyclically-placed low viscosity elastomer can also be used in combination with either embodiment shown in FIGS. 1–2.

Figure 4:
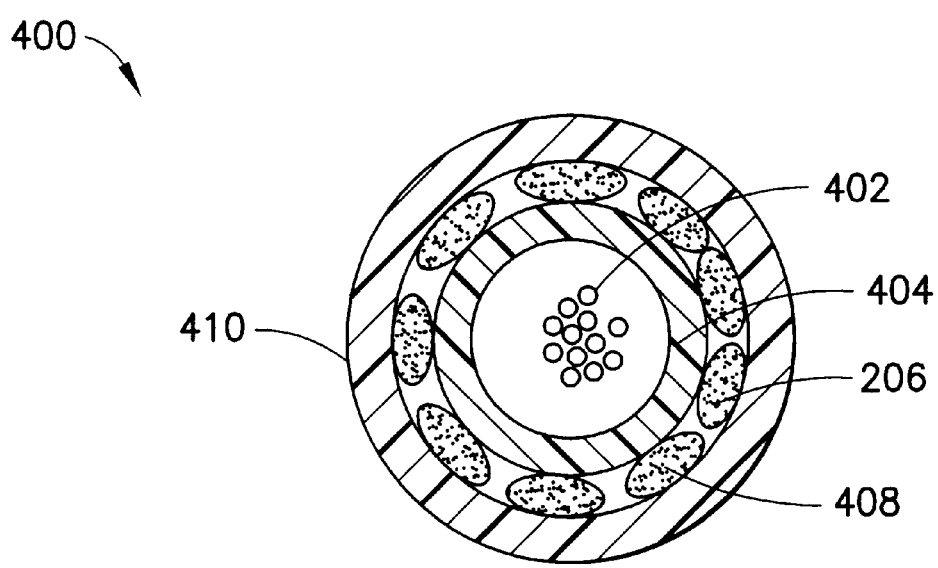
FIG. 4 is a diagram of a cross-section of a fourth embodiment of an optical fiber cable that is the subject matter of the present invention.

The New Indoor/Outdoor Cable Design in FIG. 4

FIG. 4 shows an indoor/outdoor flame-retardant cable generally indicated as 400. The indoor/outdoor flame-retardant cable 400 includes one or more optical fibers 402; a buffer tube 404 having the one or more optical fiber 402 arranged therein; a fiberglass yarn matrix generally indicated as 406 having one layer of fiberglass yarns indicated as 108 being arranged about the buffer tube 402; and a jacket 410 being arranged about the fiberglass yarn matrix 404.

Study to Support Viability of Cable Design

The following study was conducted that supports the viability of the cable design shown and described herein.

Abstract

Outdoor-Riser Cables were the start of meeting the demand for Cross-Functional Cable performance capabilities.

Point to point building plenum links across an outside plant environment illustrates the benefits of having a cable designed for Indoor and Outdoor use. The design should be as fire resistant/retardant meeting the highest rated cable flammability. The cable link should also meet outside performance and environmental stability requirements.

The development of a Cross-Functional Totally Dry Optical Fiber Cable for Outdoor, Riser and Plenum Applications required meshing GR-20-CORE, GR-409-CORE and UL 910 requirements.

Flame retardant, UV resistant plastics, water swellable materials, and flexible strength elements are combined to optimize compression and cold bend performance.

Gel-filled and dry tubes were explored, with the totally dry version being the choice for accessibility, cable preparation, and UL 910 performance.

Bare fiber exposure water ingress was investigated for attenuation increase and fiber tensile strength degradation.

A cross-function totally dry optical fiber cable was developed which meets UL 910, GR-20-CORE and GR-409-CORE requirements.

Introduction

Campus cables consist of outdoor, riser, outdoor-riser and plenum rated designs which link, point to point, to and from a plenum environment, across a riser and an outside plant environment. (See Michael R. Ellwanger, Samuel D. Nave, Harvey R. McDowell III, "High Fiber Count Indoor/outdoor Family Of Ribbon Cables", NFOEC Proceedings, 1996, pp 371–380, hereby incorporated by reference.) Newly installed indoor cables should be as fire resistant and retardant as possible to lower the aggregate flammability of new or existing installations. (See J. T. Chapin, L. Caudill, J. R. Hoover, "Comparison Of Fire Behavior Of Copper And Fiber Optic Cable In Large And Full Scale Fire Test Facilities", International Wire and Cable Symposium, 1997, pp 775–784, hereby incorporated by reference.)

Figure 5:
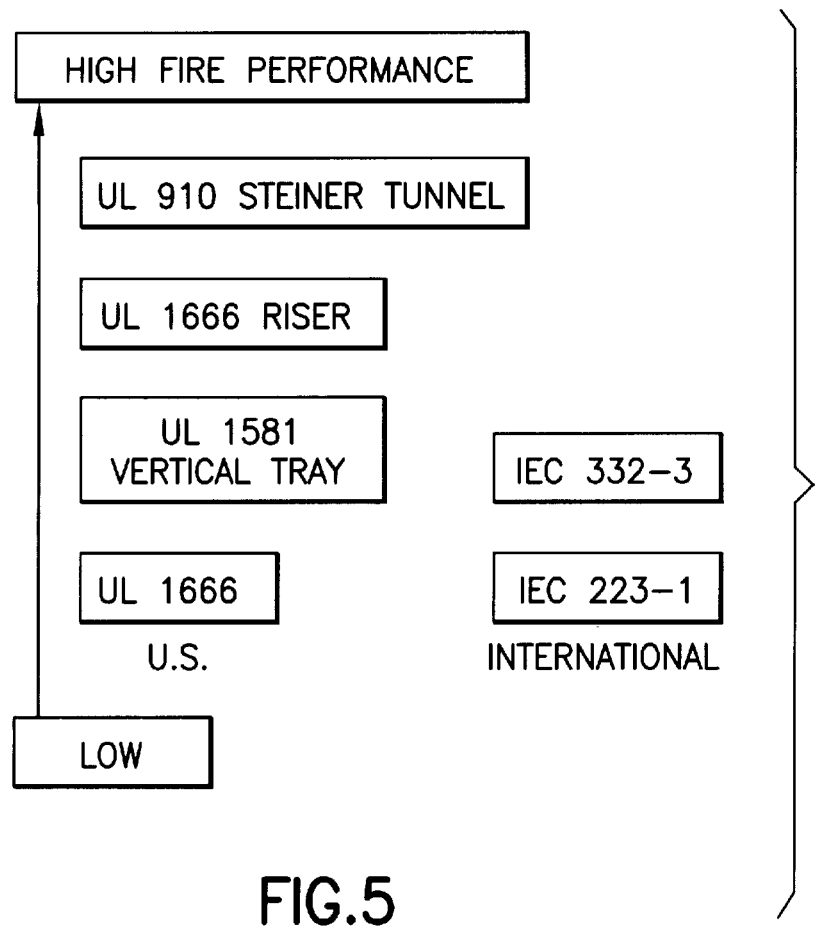
FIG. 5 is a diagram of highest to lowest rating of flammability tests in the United States and International for optical fiber cable.

The highest rated cable flammability test is the UL 910 Plenum, as illustrated from Chapin, Caudill, & Hoover hereby incorporated by reference above, and as shown in FIG. 5 of the patent application.

An outdoor-riser cable, having a higher fuel content, and effected by fire from other sources, could further enhance the magnitude and propagation of the fire, as compared to a Plenum Rated cable. (See Siegried Richter, Rudiger Schmidt, "Testing Of Cables Designed For Fire Resistance A Comparison Of U.S. And European Standards", International Wire and Cable Symposium, 1997, pp 752–760, hereby incorporated by reference.)

For convenience, some customers have used indoor plenum cables, which were not UV stabilized or designed against water ingress, for outdoor applications. The regulatory environment demands strict compliance with regard to fire hazards, but allows the customer to take their own risk with regard to outdoor performance and environmental stability.

The fire enhancement risk versus the environmental performance risk trade-off generated the need for the Development of a cross-functional optical fiber cable for outdoor and plenum applications.

This study illustrates some of the steps required to realize this objective.

Design Requirements

Current customer demand requires particular requirements of GR 20-CORE and/or GR-409-CORE to be met without exception; however, there is a certain amount of latitude allowed, based on applications, regarding:

1) OD and Flexibility of Design
2) UL Riser or Plenum Rating
3) Tensile Rating

4) Allowable Compression Resistance

5) Cold Bend Performance.

(See Ellwanger, Nave, McDowell, incorporated by reference above.)

The first step taken to realize a cross-functional totally dry optical fiber cable for outdoor, riser and plenum applications was to optimize an outdoor/riser solution which was upgraded to plenum performance.

Riser Optimized

Figure 6:
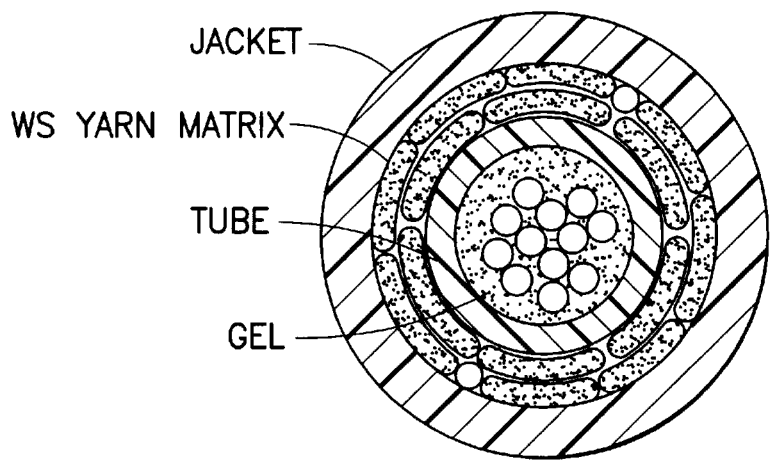
FIG. 6 is a diagram of a cross-section of a known outdoor/riser cable known in the prior art.

The current Uni-Lite Design was converted to a reduced diameter design. This more flexible, modified design is shown in FIG. 6.

UL 1666

The UL 1666 Riser 12 ft. vertical shaft flame test has five points of measurement:

1) 12 ft Maximum temperature of 850 F. 12 ft Maximum height:
2) Flame
3) Melting
4) Charring
5) Ash Results from the UL 1666 testing of two existing Riser materials are normalized and presented.

Figure 7:
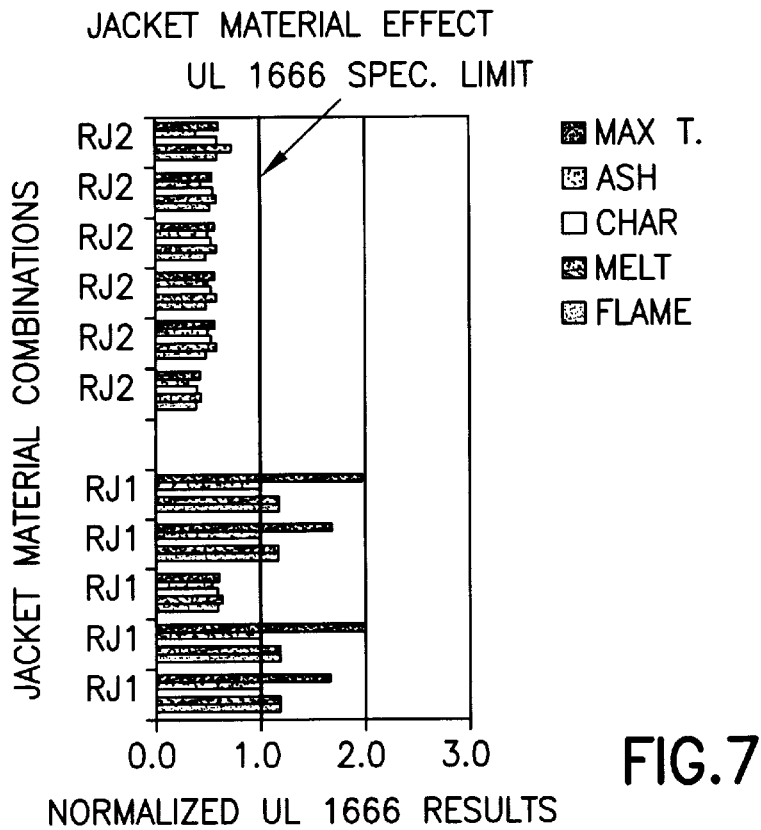
FIG. 7 is a chart of jacket material effects showing normalized UL 1666 results versus jacket material combinations.

Riser Jacket material 2 (JR2) consistently passed the UL 1666 test as illustrated by the chart shown in FIG. 7.

Figure 8:
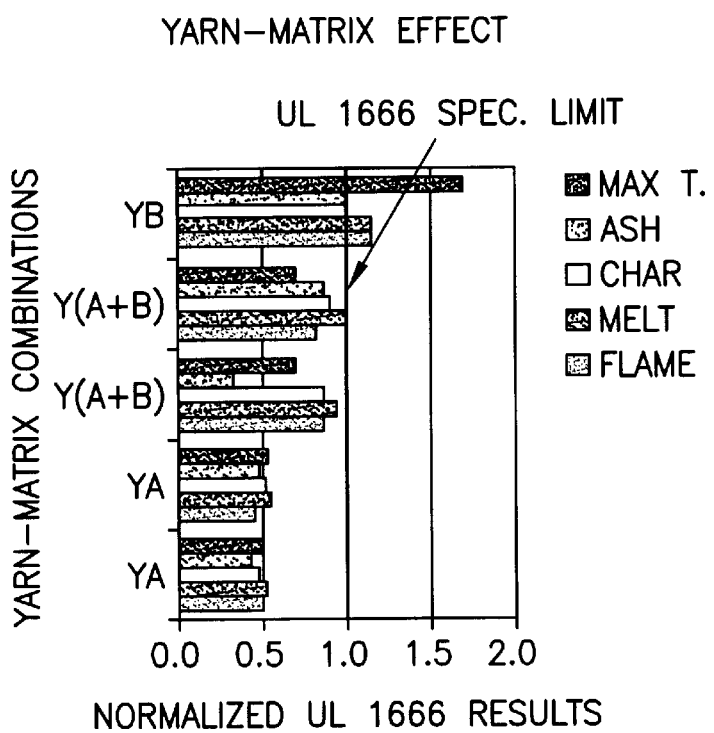
FIG. 8 is a chart of yarn-matrix effects showing normalized UL 1666 results versus yarn-matrix combinations.

Yarn-Matrix B has a greater fuel contribution than Yarn-Matrix A as illustrated by the chart shown in FIG. 8.

Yarn Matrix A (YA) performed well with R2 while use of Yarn-Matrix B (YB) was limited to a low percentage in order to allow a "passing" result on the UL 1666 Riser test.

Figure 9:
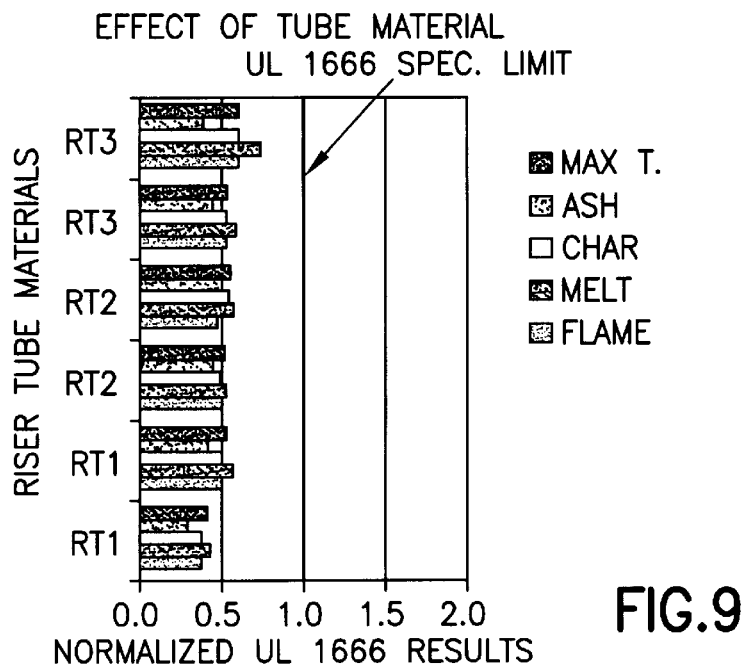
FIG. 9 is a chart of tube material effects showing normalized UL 1666 results versus riser tube materials.

Riser Tube materials RT1, RT2, RT3 were expected to have a significant fuel content variance, but their low volumetric fuel contribution, resulted in only a slight effect relative to UL 1666, as shown in FIG. 9.

Compression

Figure 10:
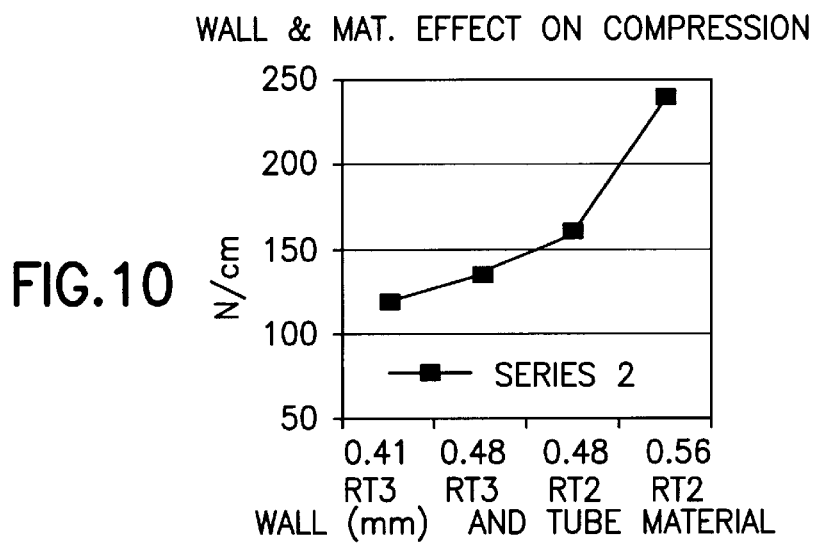
FIG. 10 is a chart of wall and tube materials effects on compression showing wall and tube materials in millimeters versus compression in newtons per centimeter.

Isolating the tube material and thickness for compression performance illustrates effect of material mechanical properties as shown in FIG. 10.

Increasing wall thickness and selecting material RT3 in place of RT2 dramatically increased the compression performance of the tube.

Figure 11:
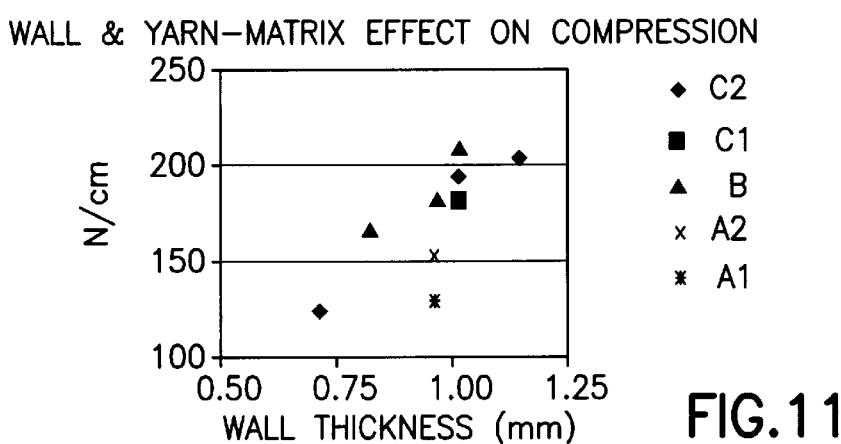
FIG. 11 is a chart of wall and yarn-matrix effects on compression showing wall thickness in millimeters versus compression in newtons per centimeter.

Increased thickness of the Jacket (RJ2) and a mix of YA and YB both generated an increase in compression resistance. YB exhibited slightly increased adhesion properties. YB was mixed with YA by increased percentages, denoted by samples A, B, and C, as illustrated in the chart shown in FIG. 11.

Outside-Plenum Development

Upgrading the Uni-Lite RD to Plenum Rating, required rethinking the material selection to meet the meshing of GR-20, GR-409 and UL 910 specifications.

UL 910 fuel content limitations indicated a preference for a dry tube without gel.

This combined with accessibility and cable splicing preparation for splicing, resulted in a choice to develop a totally dry plenum indoor and outdoor cable.

The resulting design exceeded the friendliness and relative performance of the Riser design. The tube material is very flexible, routes easily and unobtrusively in connection housings, and is clean and free of gel.

Water swellable yarn matrix strength members were used between the jacket and tube, as in the reduced diameter Riser design. A plenum flame retardant and UV Resistant material was used for the jacket material. Water swellable powder was used to prevent water ingress inside the plenum flame retardant tube, as shown for example in the cables in FIGS. 2 and 3.

UL 910

A 7.6 m long×0.3 m wide array of cables are strung from a horizontal ladder in the (UL 910) Steiner Tunnel. A 90 kW gas burner supplies direct flame to 1.5 meters length of the array. Ventilation is supplied from the burner end at a rate of 73 m per minute. (See Chapin, Caudill and Hoover hereby incorporated by reference above.)

Figure 12:
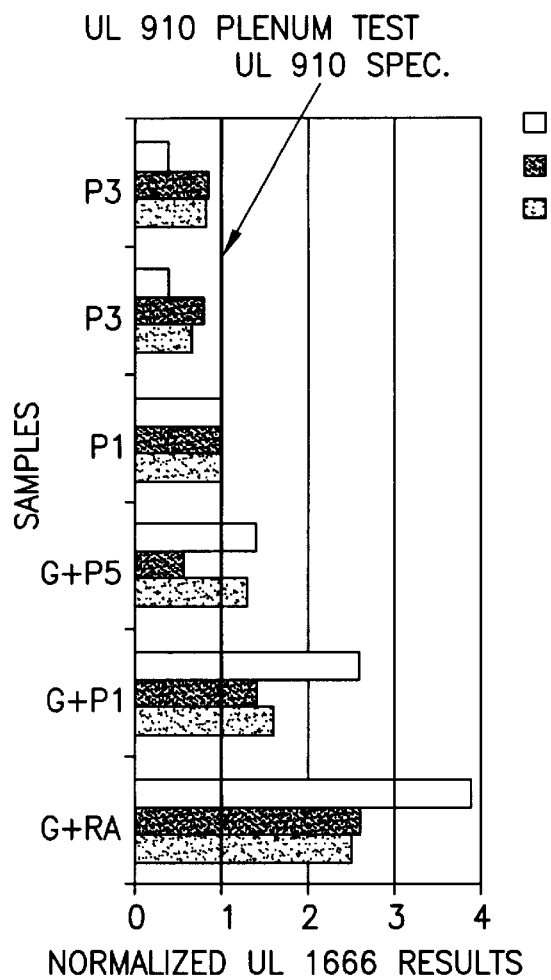
FIG. 12 is a chart of a UL 910 plenum test showing normalized UL 1666 results versus various samples.
Figure 13:
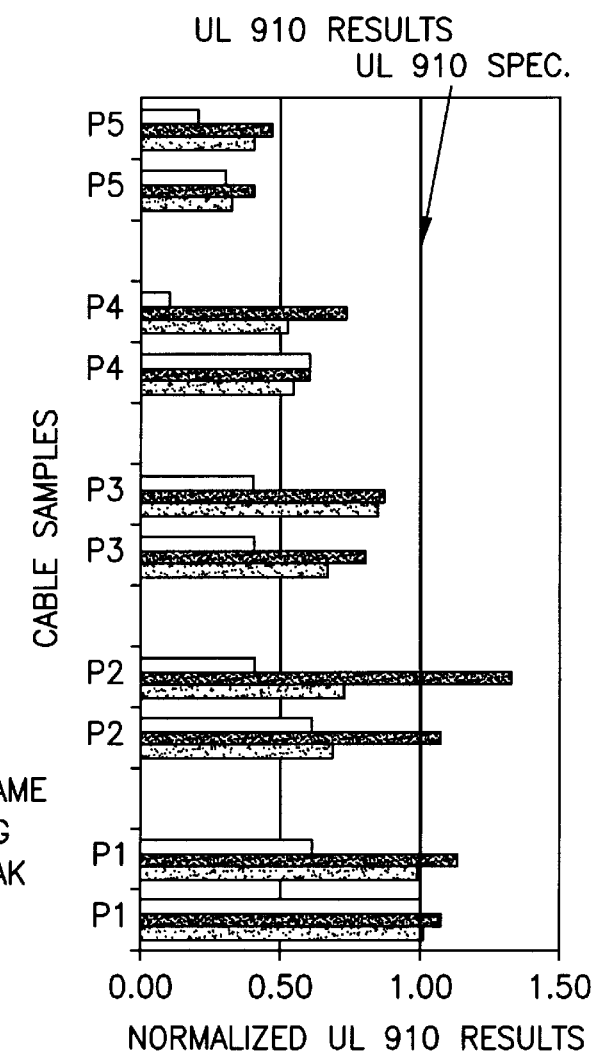
FIG. 13 is a chart of a UL 910 plenum result showing normalized UL 910 results versus various samples.
Figure 14:
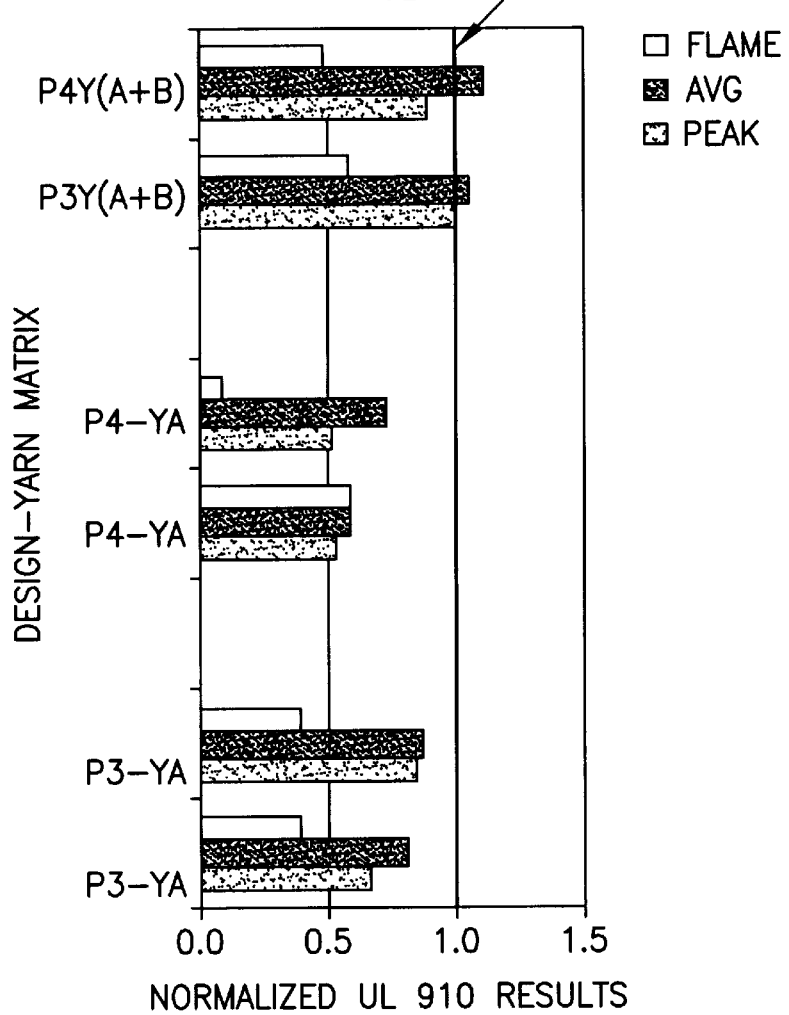
FIG. 14 is a chart of the effects of yarn-matrix on 910 showing normalized UL 910 results versus design-yarn matrix.

In the chart shown in FIGS. 12–14, sets of horizontal columns illustrate the effect of a dry versus a gel-filled tube. The columns display normalized results for the max flame, peak and average smoke from the UL 910 cable tests, performed in the Steiner Tunnel.

The first two sets of columns (from the bottom) represent materials which are equal or superior to the Riser materials mentioned previously; however, they fail the UL 910 test by a 2.5–4.0 factor, while improved Plenum materials and a dry tube resulted in a consistently UL 910 passing design.

This comparison illustrates how the greater UL 1666 Riser rated cable's fuel content, when effected by fire from other sources, could further enhance the magnitude and propagation of flames as compared to the more fire retardant and resistant UL 910 rated cables.

Of five plenum designs submitted, the P3, P4 and P5 cables met UL 910 requirements as illustrated in the chart shown in FIGS. 12 and 13. The P3 cable consists of a blend of 5–15% PVDF and 95–85% FRPVC; the P4 cable consists of a blend of about 50% PVDF and 50% FRPVC; and the P5 cable consists of 100% PVDF. The P3 and P4 cables are indoor/outdoor cables that relate to the subject matter of the present application. As shown, the P4 cable provides a much more consistent "average smoke" results when compared to the P3 cable.

Note the variability in the Peak, Average, and Flame results between the three sets of columns. The grouped normalized test results seem to provide some consistency while individual measures do not.

Yarn-matrix elements have different fuel contents as any other materials and must be considered in the final design.

The Yarn-Matrix fuel contribution was investigated.

Yarn-Matrix YA utilized in the samples 1–4 (bottom to top) met UL 910, while Yarn-Matrix YB, generated results which failed to meet UL 910 (sets 5 and 6) as illustrated in the chart shown in FIG. 14. Similar to that discussed above, the P3-YA and P4-YA cables are indoor/outdoor cables that relate to the subject matter of the present application.

Dry Interior Tube

As stated previously, the dry tube containing water swellable powder provided for improved performance in the UL 910 test.

The dry tube itself generated some questions as to how the fiber would perform when subjected to water ingress into the tube.

A 300 m tube containing optical fibers and WS Powder was respooled and a 12 mm access slice was created at every 30 m.

The length was then coiled and immersed in water for 24 hrs, measured for attenuation increase, frozen; and measured again. No increase in attenuation at the access slice was noted.

After 30 days of 23 degrees Celsius water immersion, the fibers were measured. No increase in attenuation at the access slice was noted.

As the most aggressive test, bare fibers (without tube and without water swellable powder) were immersed in 85 degrees Celsius water for 45 days. No attenuation increase at the access slice was noted.

Figure 15:
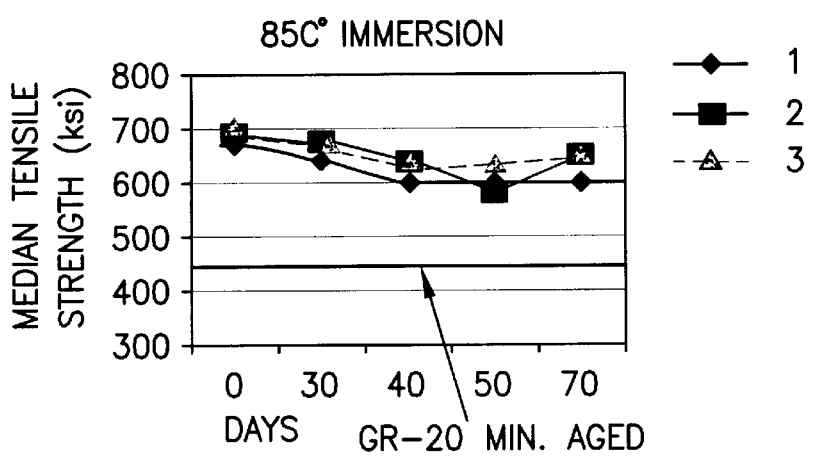
FIG. 15 is a chart of immersion at 85 degrees Celsius showing the number of days versus median tensile strength in kilograms per square inch.

Three fiber samples were subjected to 85 degrees Celsius immersion in water and their tensile strengths were measured and shown in FIG. 15.

Here a slight decrease in strength is shown, but the results are well within the limitation set by GR 20-CORE.

Outdoor-Plenum Compression and Cold Bend

P3 and P4 cables performed acceptably in compression, as compared to targets set by Ellwanger, Nave, & McDowell, incorporated by reference above. The Outdoor/Plenum Design was further modified to P6 in order to pass 20x & 10x Bend at −20 degrees Celsius in the cold bend test and generates improved compression to 120 N/cm as illustrated in the charts shown in FIGS. 16 and 17. The P2 cable has 100% FRPVC.

Test Results

UL 1666 Riser, UL 910 Plenum, GR 409-CORE and GR 20-CORE results are tabled shown in FIGS. 18–20. (See also Allan Kaiser, John C. Smith, "Indoor/outdoor Fiber Optic Cable", NFOEC Proceedings, 1996, pp 347–355, hereby incorporated by reference.)

Conclusions

1) The modified outdoor/riser cable failed the plenum burn by a 3–4 factor, illustrating the importance of the UL 910 plenum rating.

2) The material fuel characteristics of the Yarn matrix effects the overall cable flammability in both the UL 1666 Riser and the UL 910 Plenum test.

3) The Yarn-matrix adhesive relationships effects compression performance of the total cable.

4) The optimization of compression and cold bend is on-going.

5) The dry interior tube, having water swellable powder, is performing very well, and our tests are continuing.

6) The Outdoor/Riser and Outdoor-Plenum, successfully meet specific GR-20-CORE and GR-409-CORE requirements with modifications to Tensile, Cold Bend and Compression.

The aforementioned reasoning confirms the viability of the cable design of the present patent application as a sellable product in the marketplace. In particular, the cable conforms to various industry standards, including the following:

(1) the UL 1666 riser requirements related to the effects of jacket material, yarn-matrix, tube material, wall and matrix on compression, wall and yarn matrix on compression;

(2) the UL 910, GR-20-CORE and GR-409-CORE outside plenum requirements related to flammability with respect to the effects of dry versus gel filled for the maximum flame, peak and average smoke, and the effects of yarn-matrix on the UL 910 test;

(3) the UL 910 dry interior tube requirements in relation to immersion; and (4) the UL 910, GR-20-CORE and GR-409-CORE outdoor-plenum compression and cold bend requirements with respect to compressive load and cold bend.

The aforementioned concludes with UL 1666 riser test results, UL 910 plenum test results and GR-20 and GR-409 test results.

The Apparatus and Method for Making the Cables

Figure 21:
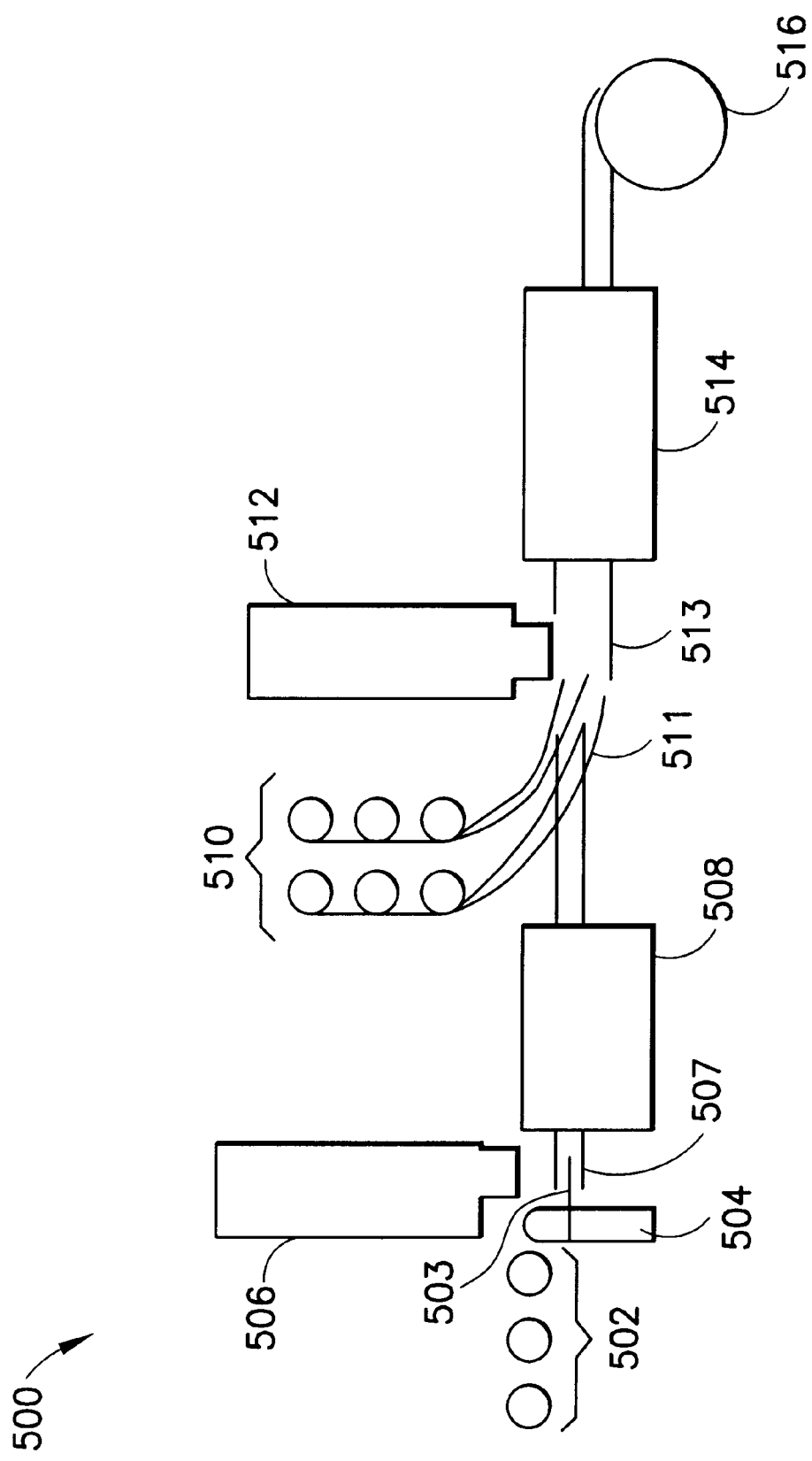
FIG. 21 is a diagram of an apparatus and method for making one or more of the cables that are the subject matter of the present invention.

FIG. 21 shows a diagram of a method and apparatus generally indicated as 500 for making the one or more cables that are the subject matter of the present patent application.

The apparatus 500 includes a fiber payoff 502 for providing optical fiber 503, a water swellable powder applicator 504, a tube extruder 506 for extruding a tube 507, a tube cooler 508 for cooling the tube 507, a yarn matrix payoff 510 for providing a yarn matrix 511, a jacket extension 512 for providing a jacket 513, a jacket cooler 514 for cooling the jacket 515, and a take-up spool 516 for taking up the cable.

The yarn matrix units are applied "longitudinally", not contra-helically as is current practice by Siecor in the Uni-lite cable design.

This allows in-line yarn replacement during the run, with lower yarn-matrix scrap, allowing for ultimately long runs, depending on fiber length. This also simplifies tandemization of tubing and jacketing process. This allows both extruders to be in the same line. The longitudinal fiberglass strand tandemization process allows strand tie-ins and longer runs than that known in the art.

Scope of the Invention

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the invention is intended to be claimed in a regular utility application to cover all of the generic and specific features of the invention herein described and all statements of the scope of the invention which, as a matter of language, might be said to fall therebetween.

In the Claims:

1. An indoor/outdoor flame-retardant cable, comprising an optical fiber; a buffer tube having the optical fiber arranged therein; a fiberglass yarn matrix having fiberglass yarns and being arranged about the buffer tube; a jacket being arranged about the fiberglass yarn matrix;

wherein either the jacket, the buffer tube, the fiberglass yarn matrix, or a combination thereof, is made from an optimal blend of flame retardant polyvinyl chloride and polyvinylidene fluoride in a range of 30–60% of polyvinylidene fluoride and 70–40% polyvinyl chloride.

2. An indoor/outdoor flame-retardant cable according to claim 1, wherein the optimal blend is a ratio of 50% PVDF and 50% FRPVC.

3. An indoor/outdoor flame-retardant cable according to claim 1, wherein the indoor/outdoor flame-retardant cable includes trace amounts of water swellable powder particles electrostatically sprinkled on the optical fiber arranged inside the loose tube.

4. An indoor/outdoor flame-retardant cable according to claim 3, wherein the trace amounts of water swellable powder particles are less than 50 microns.

5. An indoor/outdoor flame-retardant cable according to claim 3, wherein the trace amounts of water swellable powder particles are applied on the optical fiber with about 0.10–1.0 grams per meter.

6. An indoor/outdoor flame-retardant cable according to claim 3, wherein the trace amounts of water swellable powder particles are less than 50 microns, and are applied on the optical fiber with about 0.10–1.0 grams per meter.

7. A cable according to claim 3, wherein the water swellable powder is made from a copolymer blend of polyacrylate and polyalcohol resins.

8. A cable according to claim 3, wherein the cable further comprises a cyclically-placed low viscosity elastomer for connecting the one or more optical fibers to the buffer tube.

9. A cable according to claim 1, wherein the cable further comprises a cyclically-placed low viscosity elastomer for connecting the one or more optical fibers to the buffer tube.

10. A cable according to claim 1, wherein the fiberglass yarn matrix is applied longitudinally to the buffer tube.

11. A cable according to claim 1, wherein the fiberglass yarn matrix is a single layer of yarn.

12. A cable according to claim 1, wherein the fiberglass yarn matrix is a dual layer of yarn.

13. An indoor/outdoor flame-retardant cable, comprising an optical fiber; a dry-loose tube having the optical fiber arranged therein; a fiberglass yarn matrix having fiberglass yarns and being arranged about the dry-loose tube; a jacket being arranged about the fiberglass yarn matrix;

wherein the jacket is made from an optimal blend of polyvinylidene fluoride and flame retardant polyvinyl chloride in a range of 30–60% of polyvinylidene fluoride and 70–40% polyvinylidene chloride.

14. An indoor/outdoor flame-retardant cable according to claim 13, wherein the optimal blend is a ratio of 50% polyvinylidene fluoride and 50% polyvinyl chloride.

15. An indoor/outdoor flame-retardant cable according to claim 13, wherein the indoor/outdoor flame-retardant cable includes trace amounts of water swellable powder particles sprinkled on the optical fiber arranged inside the dry-loose tube.

16. An indoor/outdoor flame-retardant cable according to claim 15, wherein the trace amounts of water swellable powder particles are less than 50 microns.

17. An indoor/outdoor flame-retardant cable according to claim 15, wherein the trace amounts of water swellable powder particles are applied on the optical fiber with about 0.10–1.0 grams per meter.

18. An indoor/outdoor flame-retardant cable according to claim 15, wherein the trace amounts of water swellable powder particles are less than 50 microns, and are applied on the optical fiber with about 0.10–1.0 grams per meter.

19. A cable according to claim 15, wherein the water swellable powder is made from a copolymer blend of polyacrylate and polyalcohol resins.

20. A cable according to claim 15, wherein the cable further comprises a cyclically-placed low viscosity elastomer for connecting the one or more optical fibers to the buffer tube.

21. A cable according to claim 13, wherein the cable further comprises a cyclically-placed low viscosity elastomer for connecting the one or more optical fibers to the buffer tube.

22. A cable comprising one or more optical fibers arranged in a loose tube, wherein the cable includes only trace amounts of water swellable powder particles sprinkled and held in place on the one or more optical fibers arranged inside the loose tube.

23. A cable according to claim 22, wherein the trace amounts of water swellable powder particles are less than 50 microns in size.

24. A cable according to claim 22, wherein the trace amounts of water swellable powder particles are applied on the optical fiber with about 0.10–1.0 grams per meter.

25. A cable according to claim 22, wherein the trace amounts of water swellable powder particles are less than 50 microns in size, are applied on the optical fiber with about 0.10–1.0 grams per meter.

26. A cable according to claim 22, wherein the water swellable powder is made from a copolymer blend of polyacrylate and polyalcohol resins.

27. A cable according to claim 23, wherein the cable further comprises a cyclically-placed low viscosity elastomer for connecting the one or more optical fibers to the buffer tube.

28. An indoor/outdoor flame-retardant cable, comprising an optical fiber; a buffer tube having the optical fiber arranged therein; a fiberglass yarn matrix having fiberglass yarns and being arranged about the buffer tube; a jacket being arranged about the fiberglass yarn matrix;

wherein either the jacket, the buffer tube, the fiberglass yarn matrix, or a combination thereof, is made from an optimal blend of flame retardant polyvinyl chloride and polyvinylidene fluoride in a range of 5–15% of polyvinylidene fluoride and 95–85% polyvinyl chloride.

* * * * *